(12) United States Patent  (10) Patent No.: US 6,504,137 B1
Reznichenko                     (45) Date of Patent:     Jan. 7, 2003

(54) FOCUSING SYSTEM AND METHOD FOR USE IN IMAGING SYSTEMS

(75) Inventor: Yakov Reznichenko, Newton, MA (US)

(73) Assignee: Agfa Corporation, Wilmington, MA (US)

( * ) Notice: Subject to any disclaimer, the term of this patent is extended or adjusted under 35 U.S.C. 154(b) by 9 days.

(21) Appl. No.: 09/712,860

(22) Filed: Nov. 15, 2000

(51) Int. Cl.⁷ ............................................... G02B 27/00
(52) U.S. Cl. .................... 250/201.5; 347/256
(58) Field of Search .................... 250/201.5, 201.2, 250/201.3, 201.4; 347/256, 241, 238, 243, 244, 258, 259; 359/196, 642

(56) References Cited

U.S. PATENT DOCUMENTS

| | | | |
|---|---|---|---|
| 4,804,975 A | | 2/1989 | Yip |
| 5,105,076 A | * | 4/1992 | Premji ..................... 250/201.5 |
| 5,212,500 A | | 5/1993 | Harrigan et al. |
| 5,850,081 A | * | 12/1998 | Yanagisawa ............. 250/201.5 |
| 6,057,964 A | * | 5/2000 | Roeder et al. .............. 359/618 |
| 6,211,900 B1 | * | 4/2001 | Yamada ..................... 347/241 |

* cited by examiner

Primary Examiner—Robert H. Kim
Assistant Examiner—Hoon K. Song (74) Attorney, Agent, or Firm—William E. Hilton; Robert A. Sabourin (57) ABSTRACT

In an imaging system and method are disclosed, including a first illumination source for producing a first illumination field, a modulation system for modulating the first illumination field, and an optical imaging system for directing the modulated illumination field to an imaging surface. The optical imaging system includes at least one optical lens for directing the modulated illumination field toward the imaging surface along the optical axis of said optical lens. The at least one optical lens includes a first surface facing the modulation system and a second surface facing the imaging surface. The optical imaging system also includes a second illumination source for producing a second illumination field. The second illumination field has a frequency that is different than the frequency of the first illumination field. The optical imaging system also includes an optical assembly for directing the second illumination field toward the imaging surface along an optical path that is different than the first optical path such that the second illumination field contacts the first surface of the at least one optical lens from a direction other than that which is normal to the first surface of the at least one optical lens. The optical imaging system also includes a sensor assembly for receiving the second illumination field after it is reflected off of a portion of the imaging surface, and for producing a sensor output signal. The optical imaging system also includes a control assembly for adjusting the position of the at least one optical lens responsive to the sensor output signal.

24 Claims, 7 Drawing Sheets

FOCUSING SYSTEM AND METHOD FOR USE IN IMAGING SYSTEMS

BACKGROUND OF THE INVENTION

The invention relates generally to imaging systems, and particularly relates to imaging optics for use in relatively high power imaging systems.

Conventional imaging systems typically include a modulated illumination system for generating a modulated field of illumination, and an optical assembly for applying the modulated field of illumination to an imaging surface. Such illumination systems may provide a line of laser illumination so that a line of picture elements (or pixels) may be imaged at a time for efficiency in imaging. The field of illumination may be modulated by selectively controlling the illumination system (e.g., as disclosed in U.S. Pat. No. 4,804,975), or by using a light modulator for selectively modulating the field of illumination. Illumination systems that modulate the illumination field generally require that relatively high currents be switched on and off at fairly high speeds. The use of light modulators permits the illumination system to provide a relatively uniform field of illumination by permitting the laser emitters to exhibit relatively uniform power consumption and be maintained at a relatively uniform temperature.

Optical assemblies for applying the modulated field of illumination to an imaging surface generally include imaging optics that focus the modulated field of illumination on an imaging surface, such as a drum. Certain such optical assemblies further include automatic focusing apparatus. For example, U.S. Pat. No. 5,212,500 discloses an imaging system for a color proofing apparatus in which a secondary light source is generated that is projectable through the optical lens assembly onto the writing element. The secondary light source is then reflected off of the writing element and received at a photodetector. A movable lens element is then adjusted for automatic focusing of the optical assembly responsive to the signal generated by the photodetector. Because the system of the '500 patent is a color proofing apparatus involving dye sublimation, the power level of the primary light source for writing is relatively low, and images may be printed responsive to the reception of a small amount of light at the writing surface. Consequently, the secondary light source must be of a wavelength that is different than the wavelength of the primary light source to prevent the secondary light source from causing any images to be formed on the writing surface. Also, some undesired light (or noise), may be received by the photodetector. This is because any reflections of the secondary light off of the optical lenses in the optical assembly will be reflected back along the path of the secondary light toward the photodetector. Because the secondary light source produces a relatively small amount of light, any such reflections may adversely affect the automatic focusing assembly, particularly if the primary light source is relatively high power. Also, photodetectors that are responsive to power only, provide an indication of corrective distance but not corrective direction.

It is an object of the invention to provide an optical assembly that efficiently and accurately provides automatic focusing.

It is another object of the invention to provide an automatic focusing optical assembly for use in a high power imaging system.

It is another object of the invention to provide an automatic focusing optical assembly in a thermal imaging system for imaging thermally sensitive media.

It is another object of the invention to provide an automatic focusing optical assembly using a focusing sensor that is not responsive to power.

It is another object of the invention to provide an automatic focusing optical assembly with minimal undesired light (or noise) appearing at the focusing sensor.

It is another object of the invention to provide an automatic focusing optical assembly with a focusing sensor that provides an indication of the corrective direction as well as the corrective distance.

SUMMARY OF THE INVENTION

The invention provides an imaging system and method including a first illumination source for producing a first illumination field, a modulation system for modulating the first illumination field, and an optical imaging system for directing the modulated illumination field to an imaging surface. The optical imaging system includes at least one optical lens for directing the modulated illumination field toward the imaging surface along the optical axis of said optical lens. The at least one optical lens includes a first surface facing the modulation system and a second surface facing the imaging surface. The optical imaging system also includes a second illumination source for producing a second illumination field. The second illumination field has a frequency that is different than the frequency of the first illumination field. The optical imaging system also includes an optical assembly for directing the second illumination field toward the imaging surface along an optical path that is different than the first optical path such that the second illumination field contacts the first surface of the at least one optical lens from a direction other than that which is normal to the first surface of the at least one optical lens. The optical imaging system also includes a sensor assembly for receiving the second illumination field after it is reflected off of a portion of the imaging surface, and for producing a sensor output signal. The optical imaging system also includes a control assembly for adjusting the position of the at least one optical lens responsive to the sensor output signal.

BRIEF DESCRIPTION OF THE DRAWINGS

The following description may be further understood with reference to the accompanying drawings in which.

The drawings are shown for illustrative purposes only, and are not to scale.

DETAILED DESCRIPTION OF THE INVENTION

Figure 1:
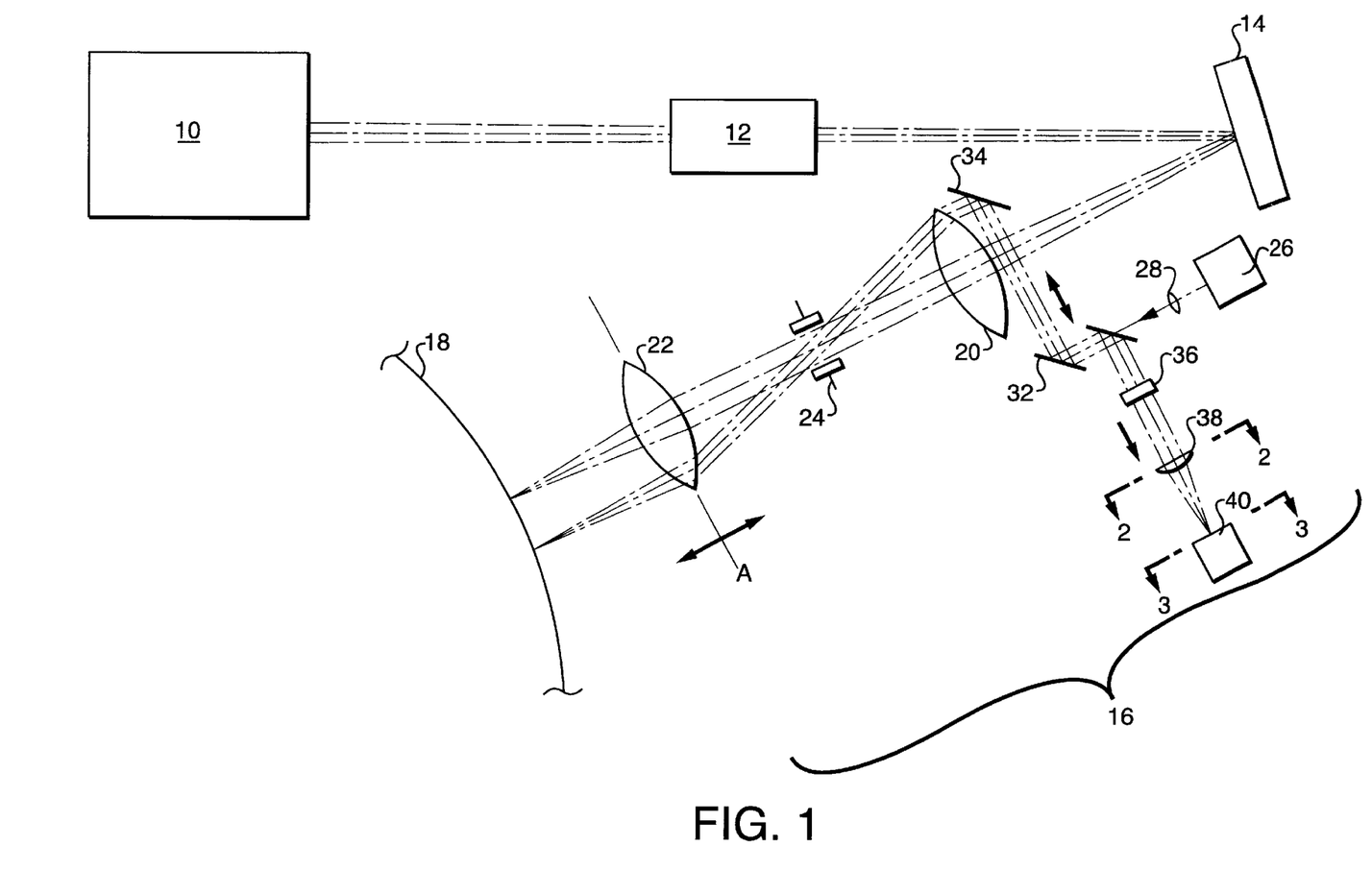
FIG. 1 shows an illustrative functional diagram of an imaging system including an optical assembly of the invention.

As shown in FIG. 1, an imaging system in accordance with an embodiment of the invention includes a relatively high power illumination source 10 such as an array of laser emitters and associated optics, a field lens system 12 including one or more field lenses, a light modulator 14, an imaging optical assembly 16, and an imaging drum for supporting a thermally sensitive recording medium 18. Generally, the illumination field is selectively focused onto the thermal recording medium to produce a desired image. The recording medium includes a protective coating that prevents the film from being imaged when exposed to light. The light protected recording medium may be selectively thermally ablated at a threshold power level for printing in accordance with thermal printing techniques.

The illumination source 10 includes an array of laser diode emitters in a preferred embodiment that generate and emit a line of continuous wave energy. The light modulator 14 is reflective in a present embodiment, and comprises a reflective grating light valve (GLV). The zero order diffraction of the illumination field from the GLV is imaged onto the thermal recording medium by the imaging optics 16. The higher order diffraction images may be blocked by appropriate optical devices (not shown), and the imaging illumination field transfers the image from the GLV to the recording medium via the imaging optical assembly.

It has been discovered that an illumination field from a secondary light source (the focusing illumination field) may be economically and efficiently used in an automatic focusing assembly with the attendant production of a minimal amount of erroneous undesired signals. In particular, it has been discovered that if the focusing illumination field does not approach the optical lens elements from a direction that is normal (i.e., perpendicular) to the surface of the lenses, then any reflected light off of the lens surfaces will not be reflected back along the same path from which the focusing illumination came. In other words, if the focusing illumination field approaches the lens elements from an off axis direction, then undesired reflected signals will not be coincident with the path of the focusing illumination, and therefore, will not reach the sensor in any substantial amount. It has also been discovered that improved results are obtained by not placing any beam splitters in the path of the primary illumination field.

An off axis automatic focusing system in accordance with an embodiment of the invention is shown in FIG. 1. In the optical assembly 16 of FIG. 1, the imaging illumination field passes through the optical path of a pair of lenses 20 and 22, as well as a pupil 24 that is positioned between the lenses 20 and 22. Each of the lenses 20 and 22 includes a curved first surface through which the imaging illumination field passes. A focusing illumination field is produced by a secondary light source 26, and passes through a collimating lens 28 and a beam splitter 30. The focusing illumination field is then directed by mirrors 32 and 34 toward the outer edge of optical lens 20 from an off—axis direction. The lens 20 directs the focusing illumination field through the pupil 24 toward the outer edge of optical lens 22 from an off—axis direction. Any reflection of this focusing field by either lens 20 or 22, therefore, will not be directed back along the path from which the focusing illumination field came.

The focusing illumination field is reflected by the imaging surface back toward the lens 22, the pupil 24 and the lens 20. This reflected field is then directed by the mirrors 34 and 32 toward the beam splitter 30, where it is redirected toward a wavelength filter 36. The reflected field may be wider than the original focusing field produced by the secondary light source 26 due to divergence as shown.

Figure 2:
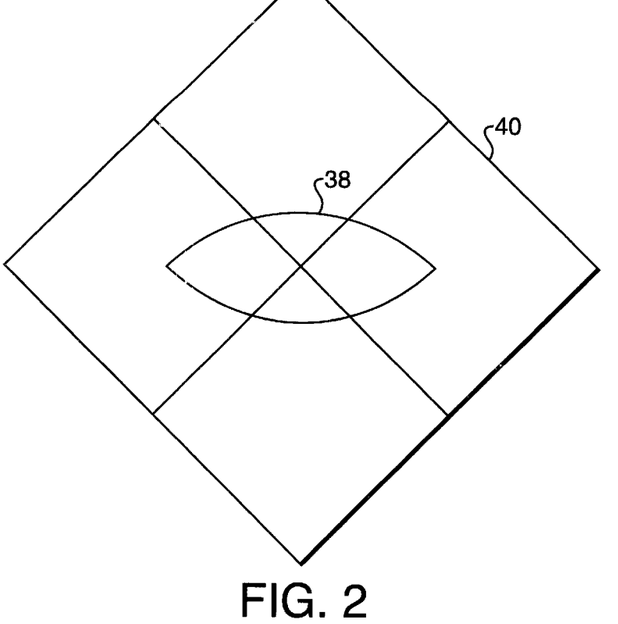
FIG. 2 shows an illustrative view of a portion of the system of FIG. 1 taken along line 2—2 thereof.
Figure 3:
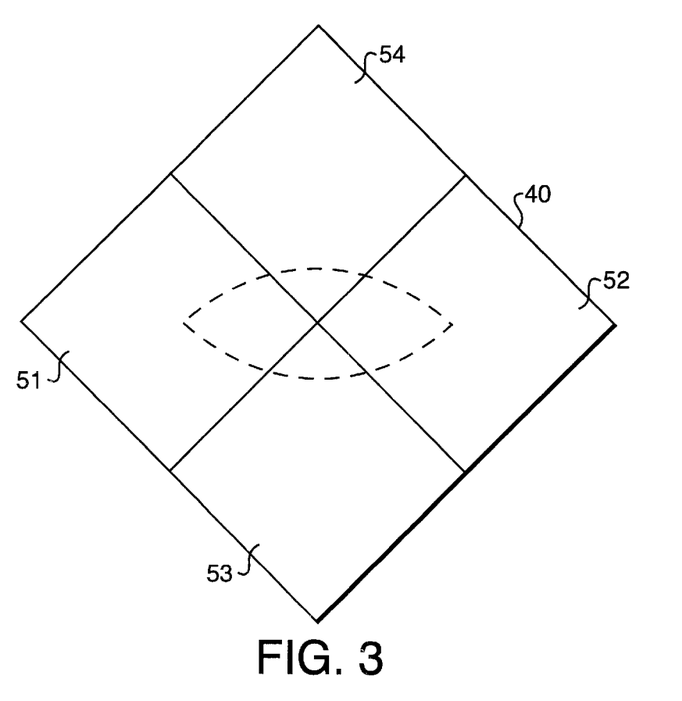
FIG. 3 shows an illustrative view of a portion of the system of FIG. 1 taken along line 3—3 thereof.

The wavelength filter 36 permits only light to pass through the filter that has the predefined wavelength of the secondary illumination source 26. The reflected focus illumination field is then passed through an astigmatic lens 38, and is received thereafter at a quad cell receiver 40. The quad cell receiver is positioned at a 45 degree rotation with respect to the axis of the astigmatic lens as shown in FIGS. 2 and 3. The quad cell receiver 40 is responsive to the phase of the focusing illumination field. Because of this, the system may determine the direction as well as the distance that the movable focusing lens must move to achieve automated focusing.

During use, the shape of the reflected focus field will vary with the position of the lens 22 as shown at "36". The shape of the reflected focus field as received by the sensors $S_1$, $S_2$, $S_3$ and $S_4$ of the quad cell receiver 40 is shown in FIG. 3. This shape changes as the focal distance of the imaging system changes, and in particular, changes in different ways depending on whether the focal distance needs to be corrected by moving the focal lens toward or away from the writing surface.

Figure 4:
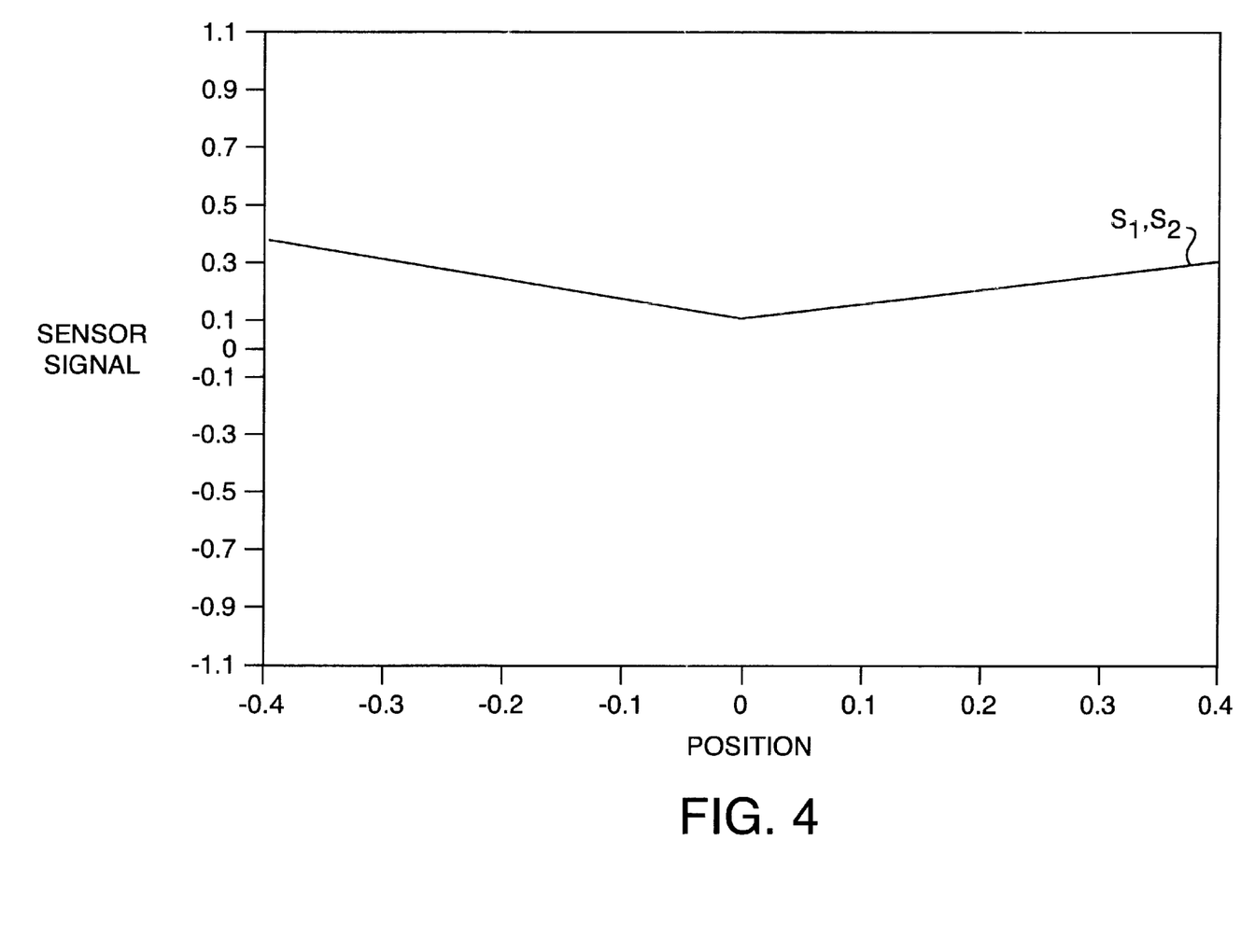
FIGS. 4–6 show illustrative graphic representations of the performance of a sensor in accordance with an embodiment of the invention.
Figure 5:
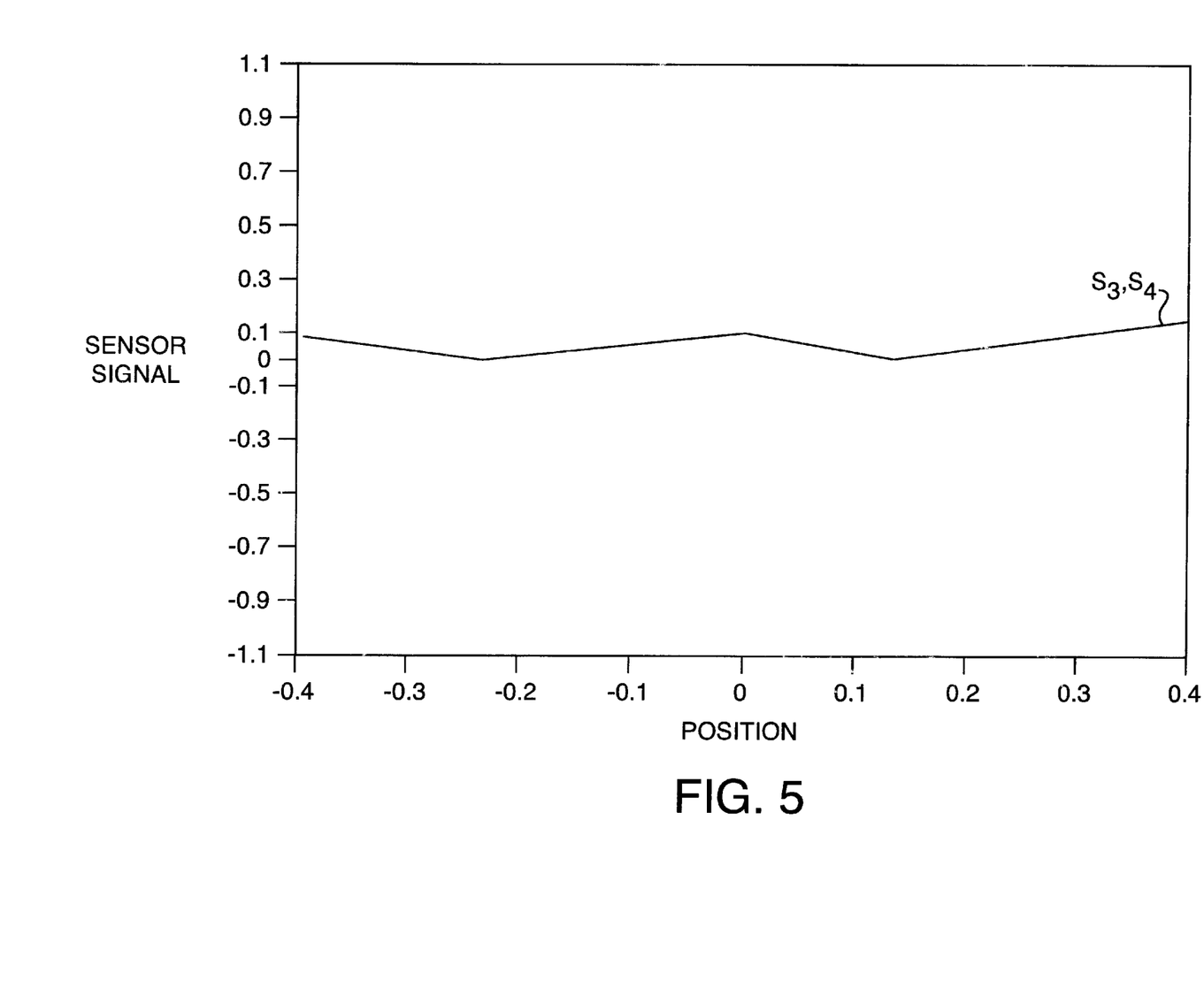
Figure 6:
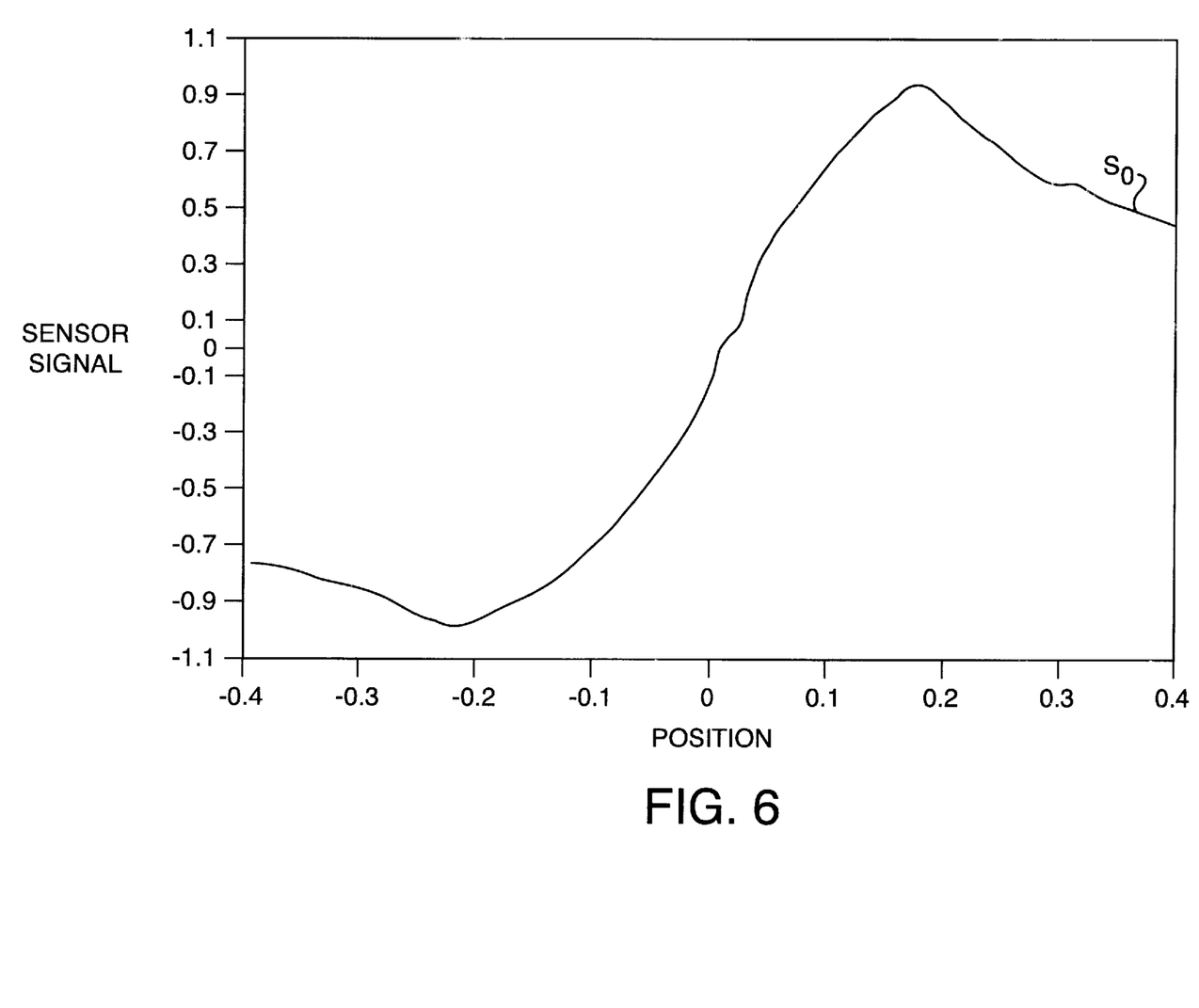

Specifically, the system combines the four sensor output signals in accordance with a particular algorithm. FIG. 4 shows the received sensor signal (in volts) vs. the autofocus position (in millimeters) for the sum of sensor output signals $S_1$ and $S_2$. FIG. 5 shows the received sensor signal vs. the autofocus position for the sum of sensor output signals $S_3$ and $S_4$. The systems determines a quad cell receiver output signal $S_O$ such that $S_O=[(S_1+S_2)-(S_3+S_4)]/[S_1+S_2+S_3+S_4]$. FIG. 6 shows the received sensor signal vs. the autofocus position for the output signal $S_O$.

The optical lens 20 is a collimating lens, which provides that the imaging system exhibits telecentricity. Telecentricity occurs when rays are normal to an incident surface. The benefit of having an imaging system with dual telecentricity is to separate diffractive orders and separate magnification adjustments from focusing adjustments. With a dual telecentric arrangement, magnification of the system is insensitive to movements of the light modulator 14, either lens 20 or 22, or imaging medium 18. Either magnification or focus, therefore, may be adjusted independent of one another. For example, adjusting the position of lens 22 as shown at "A" in FIG. 1 will result in a change of the focal plane of the imaging system, but not the magnification.

Because the focusing illumination field is off-axis with respect to the imaging illumination field, the amount of undesired reflection of the focusing illumination field (e.g., from the lenses) that is received by the sensor is minimized. Moreover, because the thermally sensitive medium records images when the power of the imaging field exceeds a threshold only, unwanted images are unlikely to be recorded on the media. For these reasons, the focusing illumination field may have a wavelength that is the same as the wavelength of the imaging illumination field in an embodiment of the invention.

Figure 7:
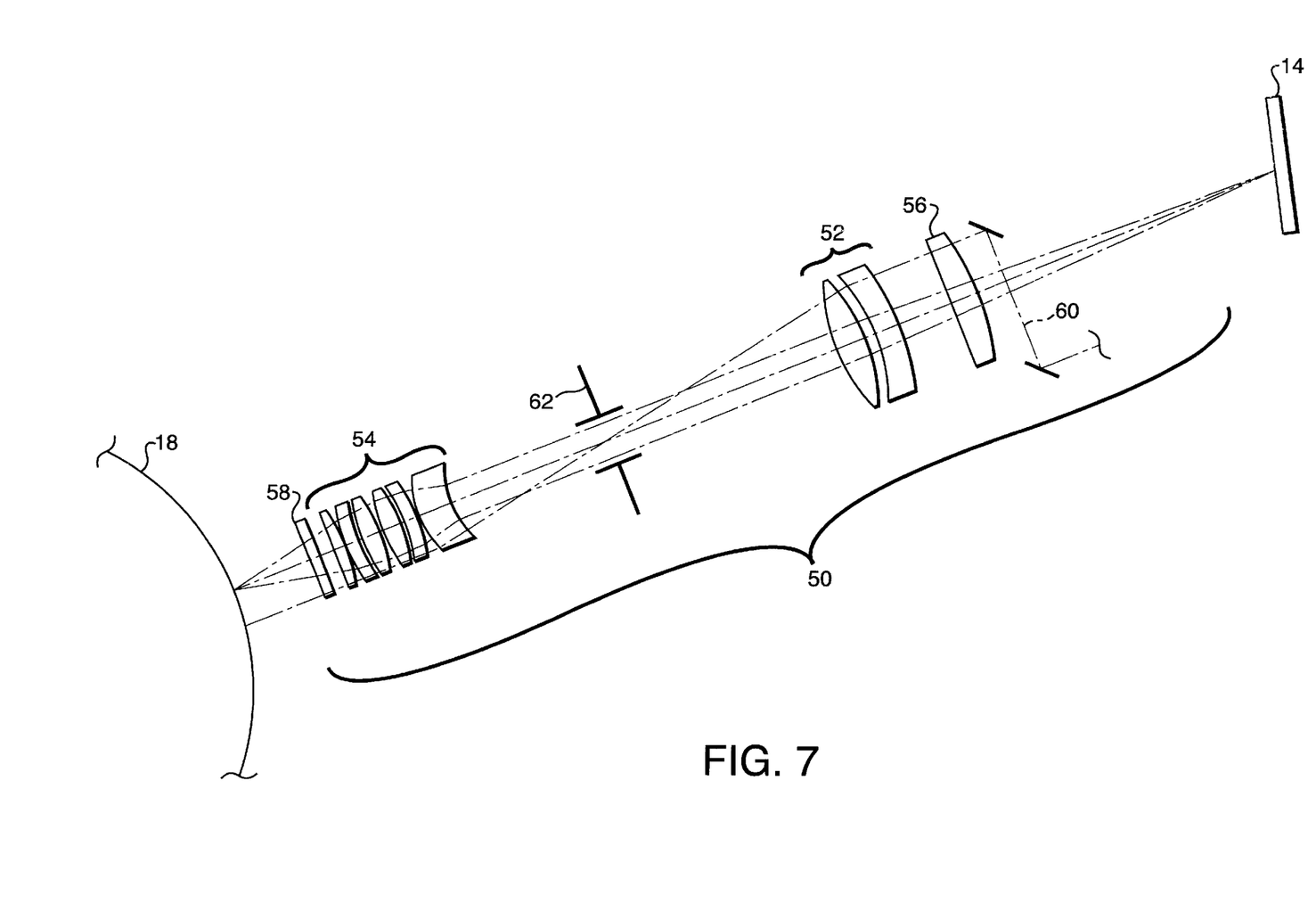
FIG. 7 shows an illustrative functional diagram of an optical imaging system in accordance with another embodiment of the invention.

In further embodiments, the optical lenses 20 and 22 may each comprise an assembly of lenses. For example, as shown in FIG. 7, in accordance with another embodiment of the invention, an optical imaging system 50 may include movable lens assemblies 52 and/or 54, as well as fixed or movable lenses 56 and 58. Lens assembly 52 is a collimating lens assembly, permitting either of lens assembly 52 or 54 to be moved responsive to the output of a sensor as discussed above. A focusing illumination field may by generated by a second illumination source as discussed above, and directed toward the writing surface 18 along an off-axis optical path 60, which passes through pupil 62.

Figure 8:
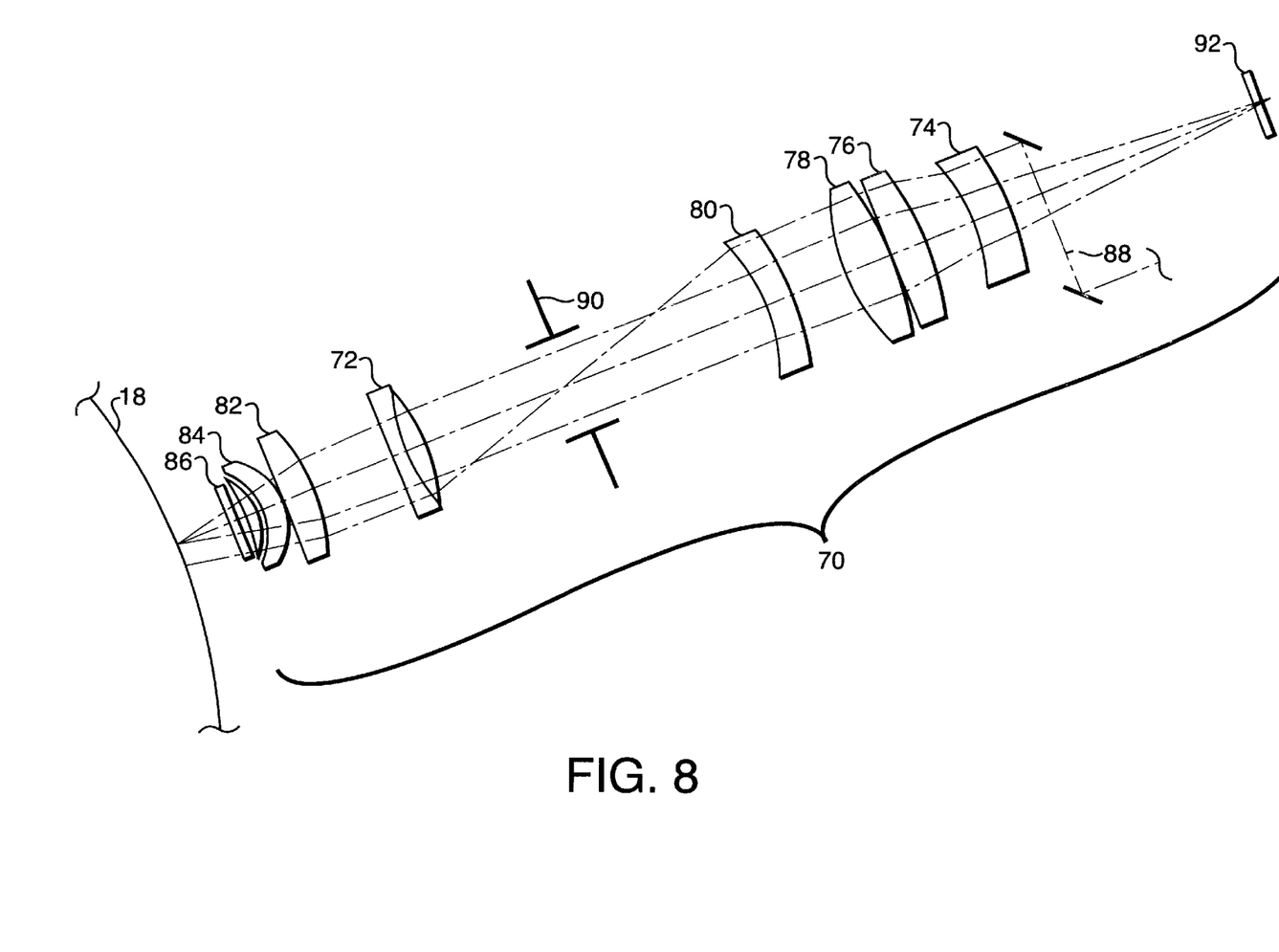
FIG. 8 shows an illustrative functional diagram of another optical imaging system in accordance with a further embodiment of the invention.

As shown in FIG. 8, in a further embodiment of the invention, an optical imaging system 70 may include movable lens assembly 72, as well as fixed or movable lenses 74–86. Lens assembly 80 is a collimating lens assembly, permitting either of lens assemblies 72 and/or 80 to be moved responsive to the output of a sensor as discussed above. A focusing illumination field may by generated by a second illumination source as discussed above, and directed toward the writing surface 18 along an off-axis optical path 88, which passes through pupil 90. In the embodiment shown in FIG. 8, the imaging illumination field is provided to the optical system 70 via a bundle of fiber optic cables 92, the illumination from one of which is shown for illustrative purposes.

An optical imaging system of the invention is preferably used with an external drum imagesetter or platesetter, so that the image is transferred onto a medium supported by the external surface of the drum. An imaging system of the invention could also be used in direct-to-press imaging to project the line of illumination directly onto a plate cylinder of a printing press. In this case, the imaging system would be replicated at each station of the printing press. Furthermore, while the head is most appropriately used in the above-described applications, it may also be used in an internal drum or capstan style imagesetter or platesetter.

Those skilled in the art will appreciate that numerous modifications and variations may be made to the above disclosed embodiments without departing from the spirit and scope of the present invention.

What is claimed is:

1. In an imaging system including a first illumination source for producing a first illumination field having a first frequency, a modulation system for modulating the first illumination field, and an optical imaging system for directing the modulated illumination field along a first optical path to an imaging surface, said optical imaging system comprising:

at least one collimating optical lens for directing the modulated illumination field toward the imaging surface along the optical axis of said optical lens as a collimated illumination field, said at least one optical lens including a first surface facing the modulation system and a second surface facing the imaging surface; a second illumination source for producing a second illumination field, said second illumination field having a second frequency;

an optical assembly for directing said second illumination field toward the imaging surface along a second optical path that is different than and non-parallel with said first optical path such that said second illumination field contacts said first surface of said at least one optical lens from a direction other than that which is normal to the first surface of said at least one optical lens;

a sensor assembly for receiving sad second illumination field after it is reflected off of a portion of the imaging surface without employing a beam splitter in said first optical path to separate said second illumination field from said first illumination field, and for producing a sensor output signal; and a control assembly for adjusting a focal point of said optical imaging system responsive to said sensor output signal.

2. An imaging system as claimed in claim 1, wherein said imaging system further includes a plurality of optical lenses for directing the modulated illumination field toward the imaging surface along the optical axis of said optical lens, each of said plurality of optical lenses including a first surface facing the modulation system and a second surface facing the imaging surface.

3. An imaging system as claimed in claim 2, wherein said second illumination field contacts said first surface of each of said plurality of optical lenses from a direction other than that which is normal to the first surface of each of said respective optical lenses.

4. An imaging system as claimed in claim 1, wherein said sensor assembly includes a quadrature sensor receiver.

5. An imaging system as claimed in claim 1, wherein said sensor assembly includes an astigmatic lens.

6. An imaging system as claimed in claim 1, wherein said sensor assembly includes a wavelength selective filter for permitting electromagnetic waves of said frequency of said second illumination field only to pass through said wavelength selective filter.

7. An imaging system as claimed in claim 1, wherein said modulation system includes a light modulator for modulating the illumination field received from the illumination source.

8. An imaging system as claimed in claim 1, wherein said optical imaging system exhibits telecentricity.

9. An imaging system as claimed in claim 1, wherein said optical imaging system includes at least two collimating lenses.

10. An imaging system as claimed in claim 1, wherein said at least one optical lens includes a plurality of lens elements.

11. In an imaging system including a first illumination source for producing a first illumination field having a first frequency, a modulation system for modulating the first illumination field, and an optical imaging system for directing the modulated illumination field along a first optical path to an Imaging surface, said optical imaging system comprising:

a plurality of optical lenses for directing the modulated illumination field toward the imaging surface along the optical axis of said optical lens, said plurality of optical lenses each including a first surface facing the modulation system and a second surface facing the imaging, surface;

a second illumination source for producing a second illumination field, said second illumination field having a second frequency;

a plurality of optical mirrors for directing said second illumination field toward the imaging surface along an optical path hat is different than and non-parallel with said first optical path such that said second illumination field contacts said first surface of each of said plurality of optical lenses from a direction other than that which is normal to the first surface of each of said plurality oaf optical lenses;

a sensor assembly for receiving said second illumination field after it is reflected off of a portion of the imaging surface without passing said second illumination field through a beam splitter in said first optical path to separate said second illumination field from said first illumination field, and for producing a sensor output signal; and a control assembly for adjusting the position of said at least one of said plurality of optical lenses responsive to said sensor output signal.

12. An imaging system as claimed in claim 11, wherein said sensor assembly includes a quadrature sensor receiver.

13. An imaging system as claimed in claim 11, wherein said sensor assembly includes an astigmatic lens.

14. An imaging system as claimed in claim 11, wherein said sensor assembly includes a wavelength selective filter for permitting electromagnetic waves of said frequency of said second illumination field only to pass through said wavelength selective filter.

15. An imaging system as claimed in claim 11, wherein said modulation system includes a light modulator for modulating the illumination field received from the illumination source.

16. An imaging system as claimed in claim 11, wherein said optical imaging system exhibits telecentricity.

17. An imaging system as claimed in claim 11, wherein said optical imaging system includes at least one collimating lens.

18. An imaging system as claimed in claim 11, wherein each of said plurality of optical lenses includes a plurality of lens elements.

19. In an imaging system including a first illumination source for producing a first illumination field having a first frequency, a modulation system for modulating the first illumination field, and an optical imaging system for directing the modulated illumination field along a first optical path to an imaging surface, a method comprising the steps of:

directing the modulated illumination field toward the imaging surface in a collimated form along the optical axis of it least one optical lens, said at least one optical lens including a first surface facing the modulation system and a second surface facing the imaging surface;

producing a second illumination field using a second illumination source, said second illumination field having a frequency;

directing said second illumination field via an optical assembly toward the imaging surface along a second optical path that is different than and non-parallel with said first optical path such that said second illumination field contacts said first surface of said at least one optical lens from a direction other than that which is normal to the first surface of said at least one optical lens;

receiving said second illumination field by a sensor assembly after it is reflected off of a portion of the imaging surface without passing said second illumination field through a beam splitter in said first optical path to separate said second illumination field from said first illumination field;

producing a sensor output signal; and adjusting the position of said at least one optical lens responsive to said sensor output signal.

20. A method as claimed in claim 19, wherein said step of directing said second illumination field along said second optical path includes tie step of reflecting said second illumination field off of plurality of mirrors.

21. The imaging system as claimed in claim 1, wherein said first frequency is the not equal to said second frequency.

22. The imaging system as claimed in claim 1, wherein said first frequency equals said second frequency.

23. The method as claimed in claim 19, wherein said first frequency is the not equal to said second frequency.

24. The method as claimed in claim 19, wherein said first frequency equals said second frequency.

* * * * *